United States Patent
Zhang

(10) Patent No.: US 8,189,778 B2
(45) Date of Patent: May 29, 2012

(54) ADAPTIVE GENERATION OF A PSEUDO RANDOM NUMBER GENERATOR SEED

(75) Inventor: Jiang Zhang, La Jolla, CA (US)

(73) Assignee: General Instrument Corporation, Horsham, PA (US)

( * ) Notice: Subject to any disclaimer, the term of this patent is extended or adjusted under 35 U.S.C. 154(b) by 995 days.

(21) Appl. No.: 12/168,477

(22) Filed: Jul. 7, 2008

(65) Prior Publication Data

US 2010/0002877 A1    Jan. 7, 2010

(51) Int. Cl.
*H04L 9/00* (2006.01)
*G06F 7/58* (2006.01)

(52) U.S. Cl. .............. 380/44; 380/46; 708/250
(58) Field of Classification Search ............ 708/250, 708/254; 380/44, 46, 251
See application file for complete search history.

(56) References Cited

U.S. PATENT DOCUMENTS

| | | | |
|---|---|---|---|
| 2006/0067527 A1* | 3/2006 | Urivskiy et al. | 380/46 |
| 2007/0244950 A1 | 10/2007 | Golic | |
| 2008/0022122 A1 | 1/2008 | Parkinson et al. | |
| 2008/0025503 A1 | 1/2008 | Choi et al. | |
| 2008/0063190 A1* | 3/2008 | Campagna et al. | 380/44 |

OTHER PUBLICATIONS

PCT Search Report and Written Opinion, Re: Application #PCT/US09/48411 Aug. 7, 2009.
Barker, E. et al., "Recommendation for Random Number Generation Using Deterministic Random Bit Generators" Revised, NIST, Mar. 2007.

* cited by examiner

*Primary Examiner* — Edward Zee
(74) *Attorney, Agent, or Firm* — Stewart M. Wiener

(57) ABSTRACT

A seed for use in a cryptographic operation for an electronic device is determined by estimating the number of entropy data bits needed to satisfy a predetermined security strength of the cryptographic operation. The estimation is based on an entropy strength of a string of entropy data bits. Entropy strength is a measure of randomness. Furthermore, guiding a determination of the seed differently according to the estimated number of entropy data bits may be performed.

16 Claims, 3 Drawing Sheets

ADAPTIVE GENERATION OF A PSEUDO RANDOM NUMBER GENERATOR SEED

BACKGROUND

Electronic devices generate random sequences for cryptography or other uses, such as gambling, statistical sampling, computer simulation, and other areas where a random sequence is useful in producing an unpredictable result.

Some electronic devices are configured to generate random sequences using a hardware random number generator. However some electronic devices are configured to generate random sequences without hardware random number generators. These electronic devices rely on software to generate random sequences. Software of this nature is referred to as a "pseudo random number generator" (PRNG) because it does not generate a truly random sequence when compared to a typical hardware random number generator.

The pseudo random number generator generates a sequence of numbers from an initial seed. Choosing a bad initial seed may result in an insufficiently random sequence. In cryptography, this means insecure cryptography. In other areas, this means that results may be predicted. Therefore, choosing a good seed is important to so that pseudo random number generators generate pseudo random sequences of sufficient efficacy so that, for example, cryptography is secure and the other results may not be easily predicted.

The efficacy of a seed may be increased by using/focusing on unpredictable events occurring in a system or on a platform from which to generate unpredictable numbers. In this, unpredictable numbers are usable to derive an initial seed of greater efficacy. If available, mouse movements, key strokes, network traffic, thermal noise, and electric noise all may be used as unpredictable events to generate unpredictable numbers.

However, not all sources of unpredictable numbers are available in every system or on every platform. For example, a mouse, keyboard, network, and/or fan may not be available in a diskless set top box platform or other embedded system. Even when sources of unpredictable numbers are available in a system or on a platform, some applications take too long to derive a good seed of desired efficacy. For example, a boot up process in some applications running on a PC may take more than 5 seconds to generate a secure pseudo random sequence. This is too long.

While the generation of sufficiently random sequences may be beneficial or even required for certain uses to increase security in cryptography and/or otherwise avoid easily predictable results, such tasks may be difficult in some systems, on some platforms, and using some applications that do not have hardware random number generators. Therefore, a secure, robust, platform-flexible, and fast technique of determining a good seed for use in cryptography or other areas may be beneficial.

BRIEF DESCRIPTION OF THE DRAWINGS

Features of the present invention will become apparent to those skilled in the art from the following description with reference to the figures, in which.

DETAILED DESCRIPTION OF THE INVENTION

Figure 1:
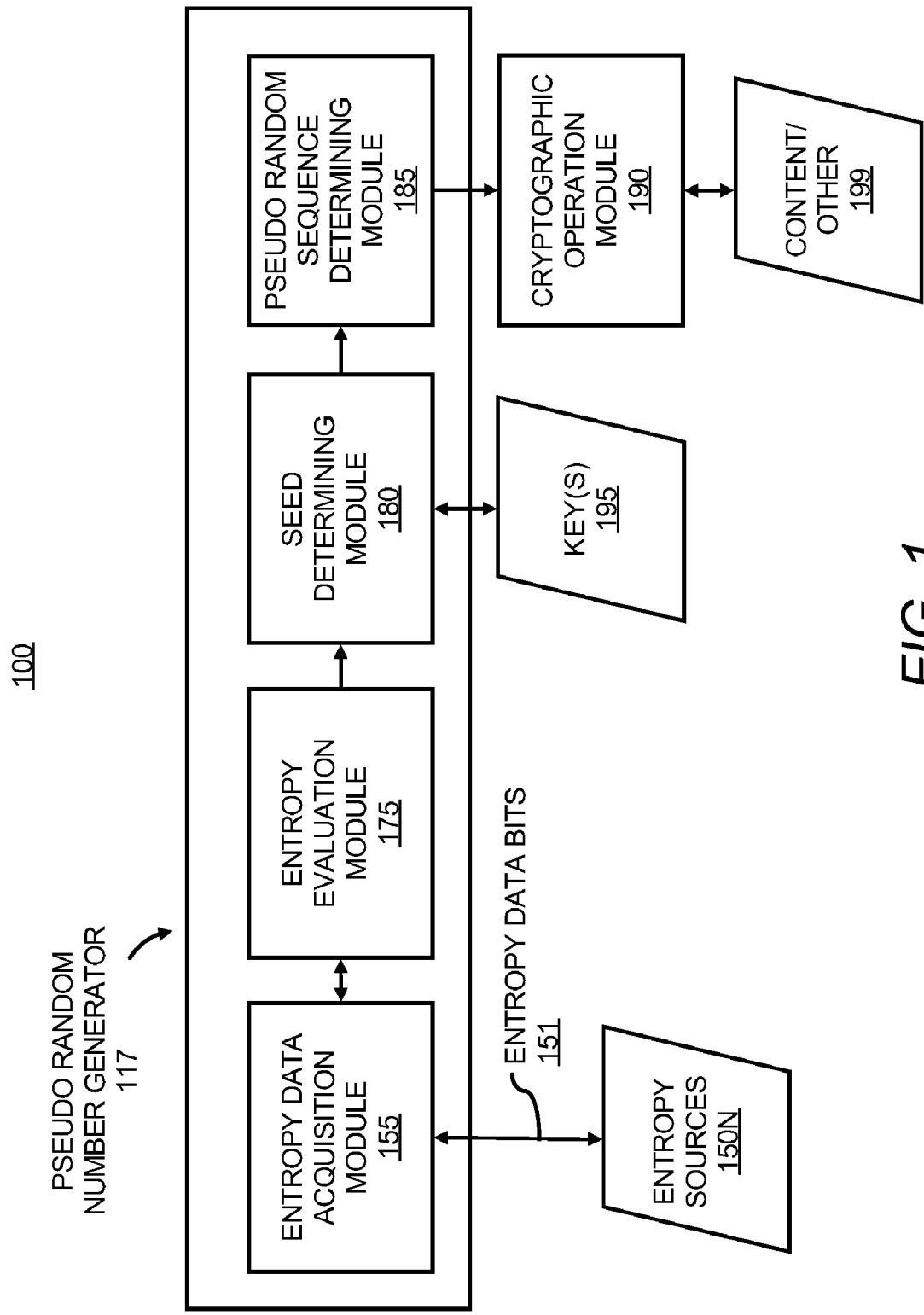
FIG. 1 shows a simplified block diagram of an electronic device 100 that is configured to determine a seed for use as a source of entropy input in a pseudo random number generator for use in a secure cryptographic operation or other use where unpredictable results are required or beneficial, according to an embodiment.

For simplicity and illustrative purposes, the present invention is described by referring mainly to one or more embodiments. In the following description, numerous specific details are set forth in order to provide a thorough understanding of the present invention. It will be apparent however, to one of ordinary skill in the art, that the present invention may be practiced without limitation to these specific details. In other instances, well known methods and structures are not described in detail so as not to unnecessarily obscure the description of the embodiments of the present invention.

According to an embodiment, a secure, robust, platform-flexible, and fast method is disclosed for determining a random, unpredictable, unguessable seed for use in a secure cryptographic operation or other use where unpredictable results are required or beneficial.

A cryptographic operation is used to hide information. For example, cryptographic operations are used by owners, distributors, and users of content including commercial content, copyrighted content, other-use content, or any content which may require or benefit from security. These cryptographic operations are used to secure, hide, store, control, and/or manage the copying, distribution, access, and use of such content and are referred to as "Digital Rights Management" operations (DRM). In this, the pseudo random number generator may be used as a basis for DRM operations.

The pseudorandom number generator uses a seed to initialize or instantiate the pseudo random number generator to generate a pseudo random sequence. A pseudo random sequence may be referred to as a pseudo random number, a pseudo random sequence of numbers, or one or more sets of pseudo random numbers or sequences that are intended to have properties that approximate a sequence of truly unpredictable random numbers. Typically, a seed itself is a sequence of random numbers and may be referred to as a sequence, a string of bits, and so forth. However, a seed is typically much shorter in bit-length than the typical pseudo random sequence that is generated from the seed.

As normally the pseudorandom number generator is deterministic, the same seed and the same pseudo random number generator will output the same pseudo random sequence. The pseudo random sequence itself is "deterministic" meaning that it repeats, ultimately. The closer the pseudo random sequence is to entirely random, the more secure the cryptographic operation or other use where unpredictable results are required or beneficial. Conversely, the further the pseudo random sequence is from entirely random, the less secure the cryptographic operation or other use. Therefore, the pseudo random sequence can be "attacked" or "hacked" using knowledge of 1) the pseudo random number generator and 2) the seed used to generate the pseudo random sequence.

Fortunately, a seed can have so many values that it may not be possible in a lifetime of an attacker/hacker to obtain the seed by "brute force" meaning by calculating each and every possible value of the seed so as to avoid having to predict its value and still obtain its value. Therefore, the deterministic pseudo random number generator may still be secure. However, it becomes very critical to generate a random, unguessable, and unpredictable seed every (or nearly every) time the pseudorandom number generator is used.

Even though a seed may be random, unguessable, and unpredictable, the security of such a seed still depends upon 3) the secrecy of the seed. Such a seed is generated and therefore exists that means that it may be discovered, copied, and used. The more secret the seed, the more secure the cryptographic operation or other use, and vice versa. For example, the closer the seed is to being hidden in an entirely random location, the more secure the operation or use. Conversely, the further the seed is from being hidden in an entirely random location, the less secure the operation or use. Therefore, the pseudo random sequence can be "attacked" or "hacked" 3) using knowledge of its location.

Fortunately, a seed can be kept secret. For example, a seed can be hidden in so many locations that it may not be possible in a lifetime of an attacker/hacker to locate the seed by "brute force" meaning by searching each and every possible location of the seed so as to avoid having to predict its location and still find its location. However, it becomes very critical to hide the seed so that it can be kept secret. For example, a seed can be hidden in a random, unpredictable, and unguessable location every time it is generated, determined, processed, guided, modified, changed, and so forth.

Figure 2:
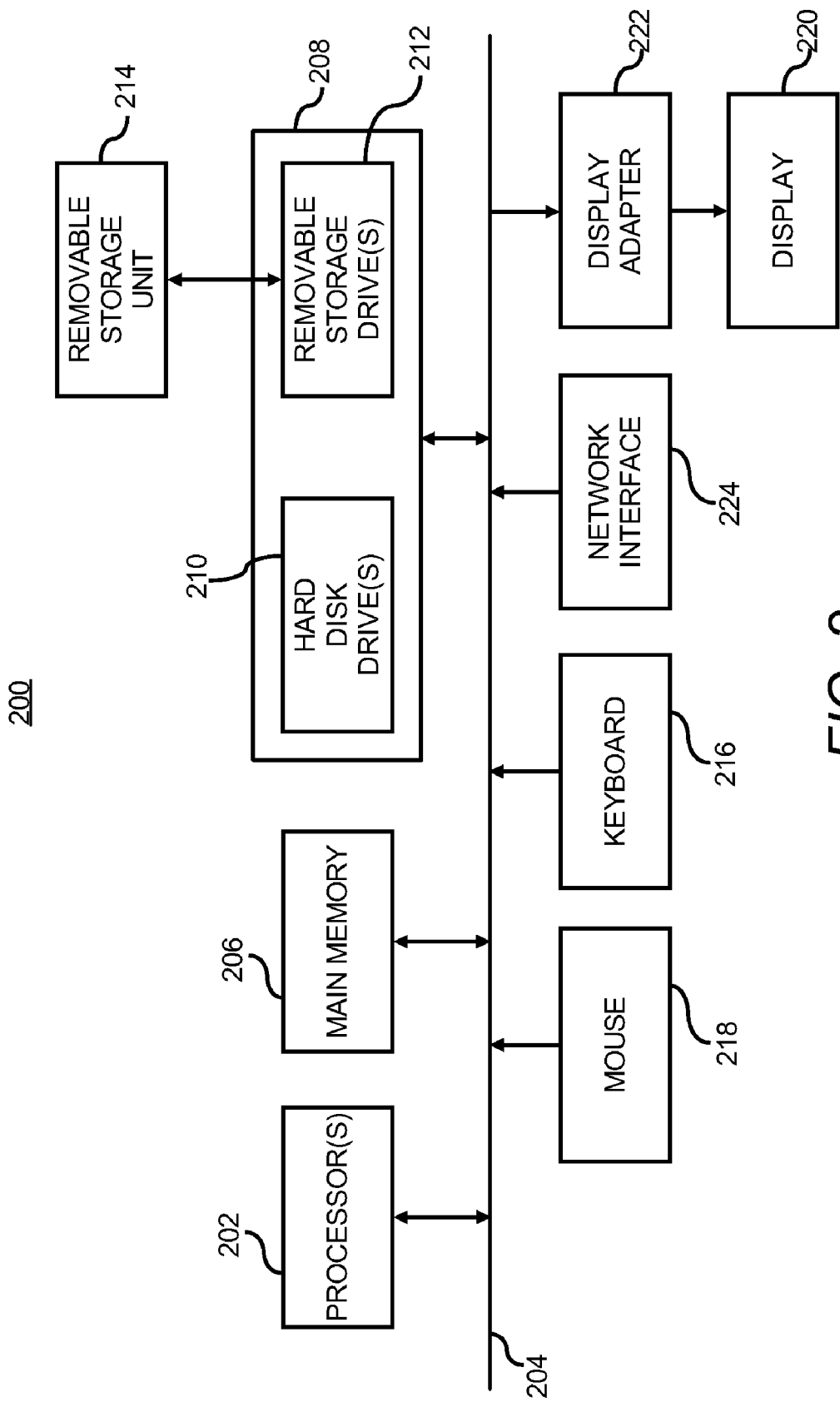
FIG. 2 shows a block diagram 200 of a computing apparatus configured to implement or execute the method 300, of the embodiment of FIG. 3, to determine a seed for use as a source of entropy input in a pseudo random number generator for use in a secure cryptographic operation or other use where unpredictable results are required or beneficial, according to an embodiment of the invention.

Turning to FIG. 1, there is shown a simplified block diagram of an electronic device 100 configured to perform various functions described herein, according to an embodiment. In FIG. 2, there is shown a simplified block diagram of a computing apparatus 200 configured to perform various functions described herein, according to an embodiment. In the embodiment of FIG. 1, reference is made to FIG. 2. However, FIG. 2 is described in even more detail further below. It should be understood that the electronic device 100 may include a media component such as a digital signal processor, a control component such as a general purpose processor, or any number of media and control components, which may be implemented in the operation of the electronic device 100.

The electronic device 100 may comprise software, firmware, hardware or a combination thereof configured to generate a seed to be used for determining a pseudo random sequence. The electronic device 100 may be a media device. Other examples of the electronic device 100 include but are not limited to a portable media player, a stationary media player, an electronic device used to support video transcoding, an electronic device that does not have a hardware random number generator, a set top box (e.g., cable, satellite, or DSL), a PC, a telephone, a cellular telephone, any other telephone, a television set, a wireless high definition interface, any other high definition interface, a computing device, an MP3 player, a transceiver such as a walky talky, a device that needs DRM, or any other device and/or process usable with security support.

As shown in FIG. 1, the electronic device 100 includes a pseudo random number generator 117, an entropy data acquisition module 155, an entropy evaluation module 175, a seed determining module 180, a pseudo random sequence determining module 185, and a cryptographic operation module 190. In addition, FIG. 1 shows entropy sources 150N, entropy data bits 151, key(s) 195, and content/other 199.

The entropy data acquisition module 155 acquires the entropy data bits 151 from one or more of the entropy sources 150N, wherein N is a positive integer. Alone, an "entropy data bit" may be 1) predictable all of the time, 2) predictable some of the time, or 3) not at all predictable. The term "entropy data" or "entropy data bits" is reference to one or more bits any one of which may be one of these three possibilities. An "entropy source" is a source of such "entropy data bits." The entropy data bits 151 are used by the entropy data acquisition module 155 to output what is herein referred to as a "string of bits."

The entropy data acquisition module 155 uses a measurable amount of time to output such a string of bits. However, in order to so use a string of bits in a cryptographic operation or other use, such a string of bits must satisfy a predetermined "security strength," as described in more detail herein further below. "Security strength" is a measure of security. It may be defined in terms of "entropy strength." "Entropy strength" is a measure of randomness.

In an example, a user of the electronic device 100 or computing apparatus 200 typically waits until a string of bits output from the entropy data acquisition module 155 satisfies a predetermined security strength during a boot up into the cryptographic operation or other use. Because a long waiting period during a boot up may result in negative user experience, a long waiting period is avoided as described herein. As another example feature, the perception or reality that a user device has frozen or even crashed is avoided. In this, the entropy data acquisition module 155 is configured to advance the booting up to the cryptographic operation upon a outputting a string of bits that satisfies the predetermined security strength. Conversely, the entropy data acquisition module 155 is configured to perform one or more iteration, as necessary, in order to output a string of bits that satisfies the predetermined security strength in order to secure the cryptographic operation or other use. All else being equal, 1) more iteration means a longer boot up time, 2) a better entropy source tends to result in less iteration, and 3) better use of an entropy source tends to result in less iteration. Typically, a better entropy source is an entropy source from which a greater number of unpredictable bits may be acquired in total (1) at any given time and (2) at a greater frequency.

Upon a determination that the predetermined "entropy strength" is not satisfied, the entropy data acquisition module 155 iteratively acquires additional entropy data bits from the entropy sources 150N until the entropy data acquisition module 155 either 1) outputs a string of bits satisfying the predetermined security strength or 2) has acquired a predetermined "maximum number of entropy data bits" but fails to satisfy the requisite predetermined security strength, described herein further below. In the later scenario, the electronic device 100 or the computing device 200 may reboot and begin again, as described herein.

The entropy data acquisition module 155 may also, as an option, process the string of bits further, alone, or in combination with any one or more additional bits, any one or more additional strings of bits, and so forth. Examples of processing that may be performed by the entropy data acquisition module 155, alone, or in any combination, include: combining; concatenating; hashing; mapping; and transforming. It should be understood however that additional processing beyond that which is enumerated herein by example may be performed by the entropy data acquisition module 155. By being configured for further processing, the entropy data acquisition module 155 is configured to operate in the electronic device 100 to operate to adaptively guide the generation of seeds having values that can neither be easily predicted nor easily located.

By processing in this manner (or, as the case may be, by additional processing in this manner), the entropy data acquisition module 155 makes it even harder for an attacker/hacker to guess the random sequence. Thus, the security of the cryptographic operation or other use may be increased. Upon outputting a string of bits from the entropy data acquisition module 155, the string of bits is input to the entropy evaluation module 175.

The entropy evaluation module 175 is configured to receive each string of bits from the entropy data acquisition module 155 (in an iterative fashion as necessary). Upon receiving the string of bits, the entropy evaluation module 175 evaluates the string of bits for 1) whether the entropy strength of the string of bits satisfies the predetermined security strength, 2) whether the predetermined maximum number of entropy data bits has been acquired (even though no string of bits has been determined to satisfy/reach the predetermined security strength in the meantime), and 3) an estimation of how many additional entropy data bits are needed to satisfy/reach the predetermined security strength. Unless the entropy evaluation module 175 has acquired the predetermined maximum number of entropy data bits without identifying a string of bits that satisfies the predetermined security strength (which may be in a first or any subsequent iteration), the entropy evaluation module 175 iteratively triggers the entropy data acquisition module 155 to iteratively acquire additional entropy data bits 151 from the entropy sources 155 N and to iteratively output a corresponding additional string of bits for evaluation in a manner described herein. Thus, the entropy evaluation module 175 adaptively guides the generation of seed(s) to save time, as will be further described herein below.

In a first scenario concerning guiding the generation of a seed to save time, the entropy evaluation module 175 estimates that the number of additional entropy data bits required (to satisfy the predetermined security strength) is much less in total than the predetermined maximum number of entropy data bits in total. In this scenario, as each iteration requires a measurable amount of time, time can be saved by merely acquiring the estimated number of entropy data bits instead of the total predetermined maximum.

In a second scenario concerning guiding the generation of a seed to save time, the entropy evaluation module 175 determines that it has acquired the predetermined maximum number of entropy data bits and has failed to measure a string of bits containing an entropy strength that satisfies the predetermined security strength. Here, the electronic device 100, for example, reports an error, reboots, and begins again. By beginning again, sooner instead of later, the user of the electronic device 100 may avoid a negative experience attributable freezing and/or crashing of the electronic device 100 due to repeated failed iterations. By beginning again instead using a string of bits containing less than the predetermined security strength, the risk of an insecure cryptographic operation is avoided.

In a third scenario concerning guiding the generation of the seed, the entropy evaluation module 175 measures the string of bits received from the entropy data acquisition module 155 and, for example, determines that the string of bits has an entropy strength that satisfies/reaches the predetermined security strength. Here, the entropy evaluation module 175 outputs the string of bits to the seed determining module 180.

The entropy evaluation module 175 may also, as fourth option, process the string of bits further, alone or in combination, with any one or more additional strings of bits. Examples of processing that may be performed by the entropy evaluation module 175, alone, or in any combination, include: combining; concatenating; hashing; mapping; and transforming. It should be understood however that additional processing beyond that which is enumerated herein by example may be performed by the entropy evaluation module 175. By being configured for further processing, the entropy evaluation module 175 is configured to operate in the electronic device 100 to adaptively guide the generation of seeds having values that can neither be easily predicted nor easily located.

By processing in this manner (or, as the case may be, by additional processing in this manner), the entropy evaluation module 175 makes it even harder for an attacker/hacker to guess the random sequence. Thus, the security of the cryptographic operation or other use may be increased.

Upon outputting a string of bits from the entropy evaluation module 175 that does not satisfy the predetermined security strength, the string of bits is output to the entropy data acquisition module 155 and, for instance, used as part of an iterative process as described herein. As fifth option, the entropy data acquisition module 155 may be configured to receive a signal from the entropy evaluation module 175 instead of receiving the string of bits itself. In this, the entropy data acquisition module 155 saves the string of bits output to the entropy evaluation module 175 in addition to outputting the string of bits to the entropy evaluation module 175. In any option, the string of bits may be used in by the entropy data acquisition module 155 in an iteration for a subsequent output of a string of bits to the entropy evaluation module 175, as described herein. However, upon outputting a string of bits that satisfies the predetermined security strength, the string of bits is input to the seed determining module 180.

The seed determining module 180 determines the seed using 1) the string of bits output from the entropy data acquisition module 155 in a manner further described herein below and 2) one or more strings of data bits such as the key(s) 195 such that at least one of the keys(s) 195 may be a secret key. Upon determination of the seed, the seed determining module 180 outputs the seed to be input by the pseudo random sequence determining module 185.

Each of the key(s) 195 key is a set of secret data used in an encryption and decryption operation to 'transform' or 'undo transform' the content/other 199 material. Different keys of the key(s) 195 specify different transformations of data. One example of the key(s) is a "public key" which is the public-part of a public key pair. Another example of the key(s) is a "private key" which may be, for example, the other or private-part of the public key pair. Another type of the key(s) 195 is a "random secret key" that may be a "symmetric key." One example of a symmetric key of the key(s) 195 is a secret key stored on the electronic device 100's one-time programmable memory. This particular one of key(s) is a "device-unique key." It can be programmed one time, so nobody can modify it, and it normally cannot be read but it can be used in a cryptographic operation or other use. For instance, it may be used to encrypt the content/other 199 material. As an option, it may be used to encrypt any one or more of the key(s) 195 and may be stored on the electronic device 100. This particular key of the key(s) 195 may be referred to as "KEK" (key encrypting key).

In an example, the seed determining module 180, upon receiving the string of bits from the entropy evaluation module 175 (that satisfies the predetermined security strength) and upon receiving a key of the key(s) 195, determines the seed from at least 1) the string of bits and 2) the key of the key(s) 195. As a first option, the at least one of the key(s) 195 may either be a secret key or a non-secret key, or a combination thereof. As a second option, the at least one or more of the key(s) 195 may be encrypted, not encrypted, or a combination thereof. In the second option, the at least one or more of the key(s) 195 may be stored in memory in encrypted form, non-encrypted form, or a combination thereof. In either option, the at least one or more of the key(s) 195 stored in memory may be used in either a current or subsequent cryptographic operation or other use. Any key stored in an encrypted format in memory may be used in the cryptographic operation or other use.

The seed determination module 180 may also, as third option, process the string of bits further, alone or in combination, with any one or more additional strings of bits. Examples of processing that may be performed by the seed determination module 180, alone, or in any combination, include: combining; concatenating; hashing; mapping; and transforming. It should be understood however that additional processing beyond that which is enumerated herein by example may be performed by the seed determination module 180. By being configured for further processing, the seed determination module 180 is configured to operate in the electronic device 100 to adaptively guide the generation of seeds having values that can neither be easily predicted nor easily located.

By processing in this manner (or, as the case may be, by additional processing in this manner), the seed determining module 180 makes it even harder for an attacker/hacker to guess the random sequence. Thus, the security of the cryptographic operation or other use may be increased. Upon determining the seed, the seed determination module 180 outputs the seed to the pseudo random sequence determining module 185.

The pseudo random sequence determining module 185, upon receiving the seed, uses the seed to determine the pseudo random sequence, as described herein. For instance, the pseudo random sequence determining module 185 uses the seed as a source of entropy input to determine the pseudo random sequence. The seed is at least a portion of the initial internal state of the pseudo random sequence determining module 185.

The pseudo random sequence determining module 185 may, as a first option, use the seed alone or in combination with any one or more other sources of entropy input in determining a pseudo random sequence. As a second option, the pseudo random sequence determining module 185 may process the seed further, alone, or in combination, with any one or more additional strings of bits. Examples of processing that may be performed by the pseudo random sequence determining module 185, alone, or in any combination, include: combining; concatenating; hashing; mapping; and transforming. It should be understood however that additional processing beyond that which is enumerated herein by example may be performed by the pseudo random sequence determining module 185. By being configured for further processing, the pseudo random sequence determining module 185 is configured to operate in the electronic device 100 to adaptively guide the generation of seeds having values that can neither be easily predicted nor easily located.

By processing in this manner (or, as the case may be, by additional processing in this manner), the random sequence determining module 185 makes it even harder for an attacker/hacker to guess the random sequence. Thus, the security of the cryptographic operation or other use may be increased.

As third option, the pseudo random sequence determining module 185 may output one or more set of pseudo random sequence(s) to store in memory (disk or otherwise) for later use. For example, any one or more pseudo random sequence may be used as a basis for another pseudo random number generator seed, alone, or in combination with any one or more additional string of bits. Examples include any number of the entropy data bits 151, any one or more partial or whole strings of bits output from the entropy data acquisition module 155, any one or more partial or whole strings of bits output from the entropy evaluation module 175, any one or more partial or whole strings of bits output from the seed determining module 180, any one or more partial or whole strings of bits previously generated by the pseudo random sequence determining module 185 itself, any string of bits stored in memory, encrypted or otherwise, and any other string of bits. In this, a fourth option is that any random sequence output from the pseudo random number generator 117 may be encrypted, not encrypted, and/or stored in memory. The pseudo random sequence determining module 185 outputs the pseudo random sequence to the cryptographic operation module 190.

The cryptographic operation module 190, upon receiving the pseudo random sequence, uses the pseudo random sequence to perform the cryptographic operation or other use. For instance, the content/other 199 material may used in the operation or use. In any scenario in which a secret key used in the operation or other use, the operation or other use may, as appropriate, be referred to as "secret key encryption," "secret key decryption," or "secret key cryptographic operation."

The cryptographic operation module 190 may, as first option, process the pseudo random sequence further, alone, or in combination, with any one or more additional strings of bits. Examples of processing that may be performed by the cryptographic operation module 190, alone, or in any combination, include: combining; concatenating; hashing; mapping; and transforming. It should be understood however that additional processing beyond that which is enumerated herein by example may be performed by the cryptographic operation module 190. By being configured for further processing, the cryptographic operation module 190 is configured to operate in the electronic device 100 to adaptively guide the generation of seeds having values that can neither be easily predicted nor easily located.

By processing in this manner (or, as the case may be, by additional processing in this manner), the cryptographic operation module 190 makes it even harder for an attacker/hacker to guess the random sequence. Thus, the security of the cryptographic operation or other use may be increased.

Figure 3:
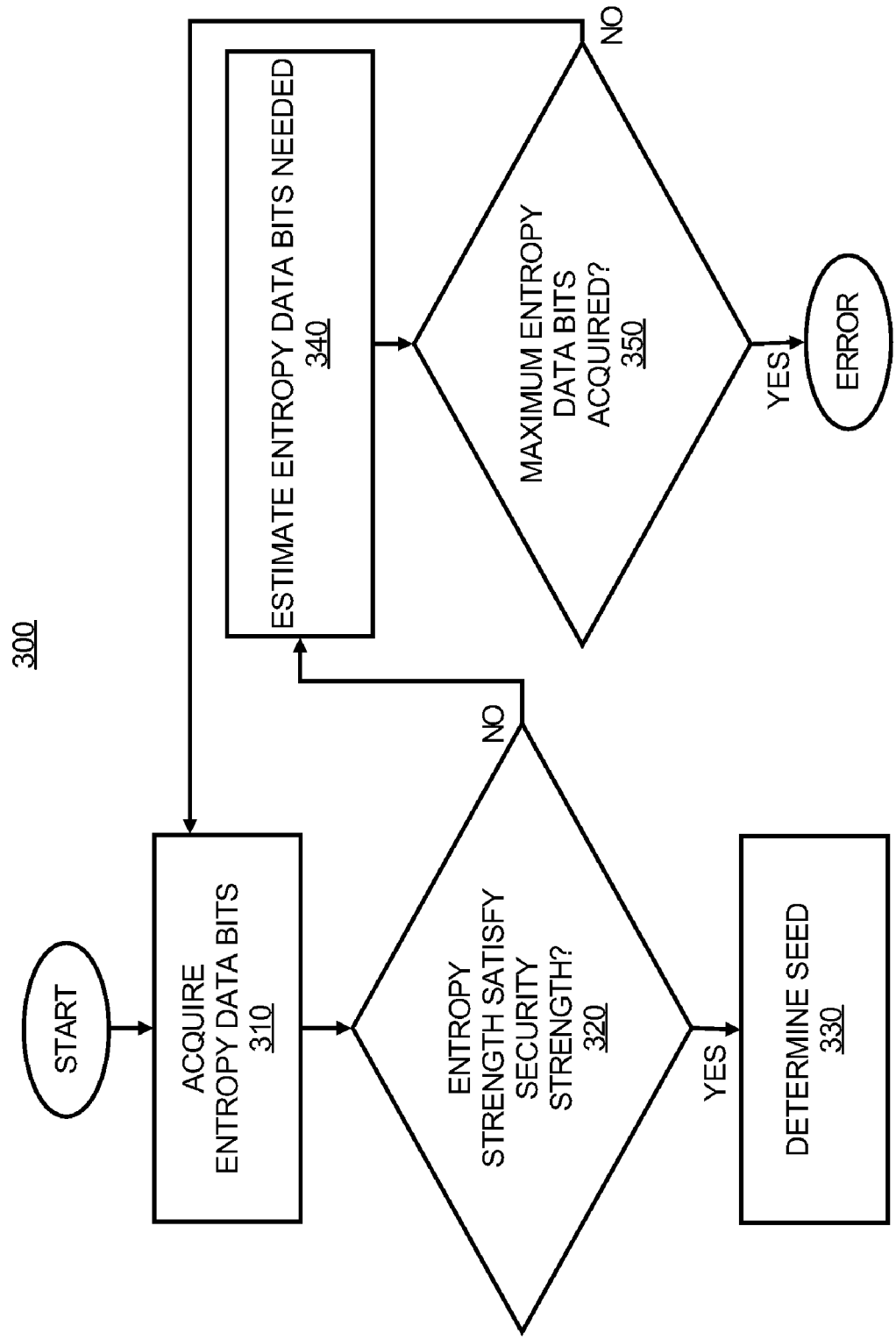
FIG. 3 shows a flow diagram of the method 300 for determining a seed for use as a source of entropy input in a pseudo random number generator for use in a secure cryptographic operation or other use where unpredictable results are required or beneficial, according to an embodiment.

FIG. 2 shows a block diagram 200 of the computing apparatus configured to implement or execute the features of the electronic device 100 in the embodiment of FIG. 1 and/or the method 300 in the embodiment of FIG. 3, according to an embodiment of the invention. The computing apparatus 200 may be used as a platform for executing one or more of the features described herein above with respect to the electronic device 100 and herein below with respect to the method 300.

The computing apparatus 200 includes one or more processors 202 that may implement or execute some or all of the steps described in the method 300. Commands and data from the processor 202 are communicated over a communication bus 204. The computing apparatus 200 also includes a main memory 206, such as a random access memory (RAM), where the program code for the processor 202, may be executed during runtime, and a secondary memory 208. The secondary memory 208 includes, for example, one or more hard disk drives 210 and/or a removable storage drives 212, representing a floppy diskette drive, a magnetic tape drive, a compact disk drive, etc., where a copy of the program code for the method 300 may be stored.

The removable storage drive 210 reads from and/or writes to a removable storage unit 214 in a well-known manner. User input and output devices may include a keyboard 216, a mouse 218, and a display 220. A display adaptor 222 may interface with the communication bus 204 and the display 220 and may receive display data from the processor 202 and convert the display data into display commands for the display 220. In addition, the processor(s) 202 may communicate over a network, for instance, the Internet, LAN, etc., through a network interface 224.

It will be apparent to one of ordinary skill in the art that other known electronic components may be added or substituted in the computing apparatus 200. It should also be apparent that one or more of the components depicted in FIG. 2 may be optional (for instance, user input devices, secondary memory, etc.)

Although described specifically throughout the entirety of the instant disclosure, representative embodiments of the present invention have utility over a wide range of applications, and the above as well as the below-described embodiments are not intended and should not be construed to be limiting, but is offered as an illustrative discussion of aspects of the invention.

A method, including example of features in which the electronic device 100 and the computing apparatus 200 may employ, will now be described with respect to the following flow diagram of the method 300 depicted in the embodiment of FIG. 3. It should be apparent to those of ordinary skill in the art that other steps may be added or existing steps may be removed, modified or rearranged without departing from the scope of the method 300.

The description of the method 300 is made with reference to the electronic device 100 in the embodiment of FIG. 1 and the computing apparatus 200 in the embodiment of FIG. 2. Thus, the description makes reference to the elements shown in FIGS. 1 and 2. However, it should be understood that the method 300 is not limited to the elements set forth in the electronic device 100 or the computing apparatus 200. Instead, it should be understood that the method 300 may be practiced by an electronic device having a different configuration than that set forth in embodiments of the electronic device 100 and the computing apparatus 200.

Some or all of the operations set forth in the method 300 may be contained as utilities, software programs, or subprograms, in any desired computer accessible medium. In addition, the method 300 may be embodied by computer programs, which may exist in a variety of forms both active and inactive. For example, the method 300 may exist as software program(s) comprised of program instructions in source code, object code, executable code or other formats in compressed or uncompressed form. Any of the above may be embodied on a computer readable medium which includes storage devices.

Exemplary computer readable storage media include any substrate which is embedded with one or more computer programs for performing one or more feature described herein as well as various conventional computer system substrates such as RAM, ROM, EPROM, EEPROM, and magnetic or optical disks or tapes. Exemplary computer readable signals on a substrate or running on one or more computer programs can be configured to access such program(s), including using signals downloaded through the Internet or other networks. Concrete examples of the foregoing include distribution of the program(s) on a CD ROM or via Internet download. In a sense, the Internet itself is a computer readable medium. The same is true of computer networks in general. It is therefore to be understood that any electronic device capable of executing the herein-described features may perform those functions enumerated above.

Any combination of one or more of a controller, such as a processor (not shown), a digital signal processor, an ASIC, a microcontroller, etc., or computer chip which combines any one or more of these components, may implement or execute the electronic device 100 and the computing apparatus 200 to perform the method 300. Alternatively, the electronic device 100 and the computing apparatus 200 may be configured to operate independently of any other processor, digital signal processor, chip, or computing device.

With reference to the embodiment of FIG. 3, FIG. 3 shows the flow diagram of the method 300 for determining a seed for use as a source of entropy input in a pseudo random number generator for use in a cryptographic operation or other use where unpredictable results are required or beneficial, according to an embodiment.

At step 310, the entropy data acquisition module 155 acquires the entropy data bits 151 from any one or more sources of entropy 150N, for example in a manner described herein above in the embodiments of FIGS. 1-2.

Depending on the platform, system, application, and so forth, some of the better entropy data sources are unavailable on some platforms and applications. However, because the string of bits is required which satisfies the predetermined security strength (to perform the cryptographic operation), an unavailability of one or more entropy sources may also mean a longer time to satisfy the predetermined security strength. For example, additional iterations to acquire additional entropy data bits (taking more time) may be required to satisfy the predetermined security strength in any platform, system, or application not having use of a better entropy source that may otherwise be available to other platforms, systems, or applications. Because however, the method 300 is adaptable to guide the acquisition of entropy data bits based on available entropy sources, a feature of the present invention includes avoiding unnecessary waiting on platforms, systems, and/or applications that can more quickly acquire a sufficient number of entropy data bits to output a string of bits satisfying the predetermined security strength.

In the method 300, the entropy data acquisition module 155 may, for example process, additionally process, and/or perform iterative operations, and so forth, as required. Examples of processing by the entropy data acquisition module 155, alone, or in any combination, include: combining; concatenating; hashing; mapping; and transforming. It should be understood however that additional processing, beyond that which is enumerated by example herein, may be performed. In this, the method 300 adaptively guides the generation of a seed having a value that can neither be easily predicted nor easily located.

In a first example of processing, entropy strength may be increased by combining two strings of bits via concatenation upon the first and second string of bits being independent with respect to each other. For instance, consider the concatenation of a first string of bits having a first entropy strength and a second string of bits having a second entropy strength independent of the first entropy strength. "Entropy strength" may be expressible as a number that indicates the predictability of a string of bits, as described herein. The entropy strength of the concatenation may be the sum of the first and second entropy strengths.

In a second example of processing, entropy strength may be distributed by hashing. In this, hashing may uniformly distribute randomness throughout the entire concatenation. Consider a digital video recording with a hard disk versus a diskless set top box. The method 300 using the entropy data acquisition module 155 is configured to acquire "entropy data bits" from one or more entropy sources 150N. For instance, a digital video recorder is a platform that typically has a hard disk to optionally use as an entropy source. Using a counter to count clock cycles elapsing during the time it takes for one or more read/write operations to the hard disk, the counter can be initiated, the read/write operation performed, and the counter read. Here, the read/write operation(s) may be unpredictable due to unpredictable variances in time attributable to, for example, temperature or other operations being performed during the read/write operation(s), and so forth. From this, the value of the count read from the counter is an example of "entropy data bits 151." Typically, a count read from a counter is more likely to have unpredictable bits in least significant bit positions of the string of bits representing the count. In this, the least significant bit may be entirely or nearly entirely unpredictable and therefore alone may be used as an unpredictable entropy data bit. As an option however, the entire bit string of the value or any portion thereof may be hashed meaning that the randomness of the least significant bit may be uniformly distributed with the other bits. After hashing, each bit in the entire string of bits may have the same randomness. In general, a string of bits having a least significant bit which is highly random and a most significant bit which is hardly random (such as a value read from a counter) may be hashed. In this, the randomness of the least significant bit will normally be uniformly distributed across all bits including to the most significant bit such that the randomness of the most significant bit may increase to approximate the randomness of the least significant bit which has decreased.

With respect to the diskless set top box, it does not have a disk to use for counting elapsed clock cycles during one or more read/write operation(s). Instead, for example, the diskless set top box may, for instance, count clock cycles elapsing during a sleep operation. When compared to the least significant bit of the hard disk read write operation however, the least significant bit of the counter value of the sleep operation may be less unpredictable.

All else being equal, more iteration may be required in the diskless set top box to output a string of bits from the entropy data acquisition module 155 that satisfies a predetermined security strength. In this, the speed of initiating the cryptographic operation may vary from platform to platform (and/or application to application and/or system to system).

For instance, a PC platform may be connected to a network that has random data available from which to source. The same PC not connected to that network does not. In another example of different platforms, a diskless set top box is different than a digital video recorder which has a hard disk. Thus, the diskless set top box does not have a hard disk to use for counting elapsed clock cycles during one or more read/write operation(s). Instead, the diskless set top box may, for example, may count clock cycles elapsing during one or more sleep operation. In yet another example, different platforms may not have access to the same entropy sources. For example, the below-described computing apparatus 200 in the embodiment of FIG. 2 may optionally use a hard disk as an entropy source. In contrast, the electronic device 100 in the embodiment of FIG. 1 may not even have a hard disk, and so forth.

The method 300 may combine any number of strings of entropy data bits. For example, the entropy data acquisition module 155 may combine multiple strings of entropy data bits which are acquired 1) during a same iteration, 2) during any one or more additional iterations, 3) from any one or more different entropy sources, 4) from any one or more different strings of bits previously determined by the entropy evaluation module 175 as not satisfying the predefined security strength, 4) from stored data, and 5) from any other data, and so forth. Similar to the example of hashing a string of bits of a counter value, hashing concatenated string of bits uniformly distribute randomness throughout the entire concatenation.

By processing in this manner (or, as the case may be, by additional processing in this manner), the random sequence determining module 185 makes it even harder for an attacker/hacker to guess the random sequence. Thus, the security the cryptographic operation or other use may be increased.

The method 300 may include, for example, measuring randomness of each string of bits output from the entropy data acquisition module 155 to determine whether each string has an entropy strength that satisfies the predetermined security strength, estimating/determining how may additional entropy data bits may be needed to satisfy the predetermined security strength based on the uncertainty of guessing any given bit in a current string of bits, and acquiring determined estimated additional entropy bits, in iterations as required.

At step 320, the entropy evaluation module 175 determines whether the string of bits (output from the entropy data acquisition module 155) satisfies the predetermined security strength. For instance, the string of bits can be quantified as a number expressible as a number of bits in terms of entropy strength. Entropy strength can be referred to in terms of a number of bits. Entropy strength should not be confused with the term "entropy data bits" which refer to the input of the entropy data acquisition module 155 in the embodiment of FIG. 1. However, a feature of the present invention is to estimate the entropy data bits needed to satisfy the predetermined security strength such that the entropy data acquisition module 155 acquires the estimate in an iteration as necessary.

Like the estimated number of entropy data bits, the predetermined "security strength" can be quantifiable as a number of bits. From these two numbers, the decision can be made at step 320 as to whether the string of bits output from the entropy data acquisition module 155 satisfies the predetermined security strength. For instance, the string of bits satisfies the predetermined security strength upon a decision that the number of "entropy strength" of the string of bits is equal or greater to the predetermined security strength.

At step 330, upon determining that the entropy strength of the string of bits output from the entropy data acquisition module 155 satisfies the predetermined security strength, the seed determination module 180, for example, receives the string of bits from the entropy evaluation module 175 and determines the seed to use in the cryptographic operation in a manner, for example, as described above with respect to the embodiment of FIGS. 1 and 2.

Upon the string of bits not satisfying the predetermined security strength and not exceeding a predetermined maximum number of entropy data bits, the method 300 iteratively acquires additional entropy data bits each iteration resulting in an additional output of 'string of bits,' for instance, from the entropy data acquisition module 155 iteratively outputs each additional string of bits. In this, the duration of boot up time into the cryptographic operation may vary from system to system and/or on a platform to platform basis. Regardless of system and platform however, boot up time into the cryptographic operation is guided on, for example, an operation by operation basis.

Normally, upon the string of bits satisfying the predetermined entropy strength (as determined by the entropy evaluation module 175) the entropy data acquisition module 155 does not output additional 'strings of bits,' as described herein below. In this, the duration of boot up time into the cryptographic operation is decreased.

At step 340, the entropy evaluation module 175, for example, estimates the total number of entropy data bits required to satisfy/reach the predetermined security strength. The entropy evaluation module 175 measures the entropy strength of the string of bits in a well known manner, for example, using the standard NIST SP 800-90, Appendix C, March 2007 which describes a conservative manner of measuring, entropy in a string of bits using the equation $H_{min}=-lg_2(p_{max})$.

Let the predetermined security strength be 112 bits in total. Normally, the number of combinations required to break a random sequence by "brute force" is $2^{security\_strength}$ in total. "Brute Force" is exhaustively working through all possible combinations in order to find the combination that decrypts thereby avoiding guessing. The greater the security strength the more possible combinations of "brute force" are required to be calculated to crack the predetermined entropy bit strength. In this example, the predetermined security strength of 112 in total has a combination count of $5.19229685853 \times 10^{33}$ in total ($2^{112}=5.19229685853 \times 10^{33}$). In a first scenario, upon a decision that the string of bits satisfies the predetermined security strength, the method 300 proceeds to determine the seed at step 330. In a second scenario, upon a decision that the string of bits fails to satisfy the predetermined security strength, an estimation is made of how many additional entropy data bits are required to satisfy the predetermined security strength. In a third scenario, upon a decision that the predetermined maximum number of entropy data bits has been acquired, the method 300 sends an error, reboots, and begins again.

Let the bit-length of string of bits also be 112 in total. In addition, let the count of the entire string of bits be 70 "1"'s and 42 "0"'s (70+42=112 bits). (Note that this particular type of count is a 1-bit value count. Other well known types of counts may be performed, such as a 2-bit value count, 4-bit value count, etc.) Here, for each bit, 1) the $p_{max}$ or maximum probability of guessing each bit ("0" or "1") is 62.5% (70/112=0.625) and 2) the $H_{min}$ or the estimate of randomness of each bit is 67.8% ($H_{min}=-lg_2(0.625)=0.678$). The entropy strength of the entire string expressed in "entropy bits" is 76 in total ($112 \times 0.678=75.936$). Therefore, the estimated number of to require an additional "entropy bits" of 36 in total (112−76=36).

For instance, according to the principles of probability with respect to the 1-bit value count (70 "1"'s and 42 "0"'s), this means that the maximum probability of guessing any given bit value of the 112-bit string of bits is 0.625 or 62.5% (70/112=0.625). According to the above equation, each bit (in the string of bits output from the entropy data acquisition module 155) is estimated to have an entropy of 67.8% randomness per bit ($H_{min}=-lg_2(0.625)=0.678$). Rounding up to the nearest whole number, the entropy strength (in the string of bits output from the entropy data acquisition module 155) expressed in "entropy bits" is 76 in total ($112 \times 0.678=75.936$). Therefore, the 76 "entropy bits" is less than the predetermined security strength, the predetermined security strength is 112. Here, the security strength of 112 is estimated to require an additional "entropy bits" of 36 in total (112−76=36). As each data bit has an estimated entropy of 0.678, the predetermined security strength of 112 is estimated to require acquisition of an additional "entropy data bits" of 54 in total (36/0.678=53.097).

As an option, one technique to make the entropy estimate more accurate is to track average minimum entropy and, for example, store the average minimum entropy in a file. The average minimum entropy file may store the average minimum entropy of all, nearly all, or some entropy data bits generated in the past by in the electronic device 100. The value of the average minimum entropy may be updated every time additional entropy data bits are generated and/or acquired. At step 340, instead of estimating the number of additional entropy data bits to acquire based on, for example, one string of bits output from the entropy data acquisition module 155 (a relatively small sample of data acquired in one iteration) the method 300 may use a historical average of prior estimates so as to subsequently acquire the historical average. For instance, the historical average may call for acquiring fewer additional entropy data bits than a current estimate. By relying on the historical average instead of the current estimate alone, the method 300 may acquire the additional entropy data bits that will, on the average, satisfying the predetermined security strength. As the historical average calls for acquiring a smaller number of additional entropy data bits as successfully satisfying the predetermined security strength on average, the method 300 may increase the speed of satisfying the security strength by saving time avoiding acquisition of the higher estimate. In this, the higher number can become part of the future average, and so forth.

At step 350, the entropy evaluation module 175, for example, determines whether the predetermined maximum number of entropy data bits has been acquired. Let the predetermined maximum number of entropy data bits be 512 in total. In an example, upon the first iteration the entropy data acquisition module outputs a string of bits of 212 in total. In scenarios where the string of bits does not satisfy the predetermined security strength, the method 300 may iteratively acquire additional entropy data bits in a manner described herein. For instance, upon outputting a string of bits from the data acquisition module 155 of 212 bits in total, the data acquisition module 155 is limited to acquiring any more than an additional entropy data bits beyond 300 in total (512−212=400). For example, regardless of the number of iterations, upon reaching 512 bits in total, the method 300 reports an error, reboots, and begins again. In this, the method 300 may acquire 512 entropy data bits in total before again sending an error, again rebooting, and again beginning.

In the example where 54 entropy data bits are estimated as needing to be acquired to satisfying the security strength, let the estimate be accurate so that the predetermined security strength is satisfied after acquiring the additional 54 entropy data bits. The fact that the number of entropy data bits acquired at this point is 266 in total (212+54=266), which is much less than the predetermined maximum number of entropy data bits (512), time can be saved by acquiring the 266 entropy data bits instead of acquiring 512 entropy data bits, as the difference is not needed to satisfy/reach the predetermined security strength.

However, a determination that the predetermined maximum number of entropy data bits has been acquired is possible after much iteration characterized with a failure to determine at step 320 that the entropy strength of the string of bits output from the entropy data acquisition module 155 satisfies the predetermined security strength. In this situation, the electronic device 100 outputs an error, reboots, and again tries to determine the seed that satisfies the predetermined security strength.

The method 300 may perform mapping/transforming techniques to map entropy data bits from smaller spaces to larger spaces to make an unpredictable seed harder to locate. For example, applying an encryption to a shorter bit-length seed using a device-unique secret key may map the seed from a smaller "searching space" to a larger "searching space" and consequently make the guessing of the seed by an attacker/hacker more difficult. Here, the "searching space" is the data space that an attacker/hacker may need to go through to find the matching data he/she is looking for.

For example, upon encrypting a 64-bit random number using 128-bit AES encryption algorithm with a 128-bit key, and using the 128-bit encrypted data as the PRNG seed, as the encryption may evenly distribute the encrypted values of all 64-bit data in the 128-bit data space (a feature of the AES), the attacker/hacker has to search the 128-bit data space to find the seed value, which is much more difficult than searching in the 64-bit data space. Although this mapping/transforming does not map to all the data in the 128-bit space, the attacker/hacker does not know which part of the data is mapped from the 64-bit space, he/she has to search the whole 128-bit space, because any data could be mapped. For instance, the method 300 may transform an N-bit string of entropy data bits to an M-bit string of entropy data bits using secret key encryption, wherein N and M are integers and N is less than M. For example, N may be 64 bits and M may be 128 bits.

Other entropy sources, beyond that which is described herein, may be used as a basis to acquire strings of entropy data bits. Additional examples of the entropy sources 150N of the electronic device 100 include a digitization process, an assessment process, an optional conditioning process, an interrupt call, a time stamp, a file system, and so forth. One type of file system that may have changing file information and therefore be an entropy source 150N is the Linux file system. For instance, changing file information in the Linux file system may include 1) when a file is accessed, 2) when a file is modified, 3) when a file is changed, 4) the size of whatever file, 5) the inode name of whatever file, and so forth. However, other file systems may have changing file information and therefore are additional examples of the entropy sources 150N.

Because the entropy data bits 151 may be acquired from any source, alone or in any combination, they may be acquired from additional entropy sources beyond those described herein. Nevertheless, entropy data bits may be acquired from one or more measurements of anything about an entropy source which is unpredictable may be used as entropy data bits, the description herein provides examples. In this regard, additional described-examples include a counter or timer that has elapsed, during one or more of these variable movements, events, activities, operations, and processes, may be read to acquire entropy data bits. As an example, a counter can be started, one or more read/write operations to a hard drive/disk file may be performed, and the counter read to acquire the string of bits representing the count. Because hard drive read/write operations typically vary in time, the count-value may be unpredictable and therefore regarded as a string of entropy data bits. Other examples include counting the time of interrupt calls, sleep mode operations, and so forth. Further examples include any measurement whatsoever of movements of a computer mouse, strokes of a computer keypad, the nature and/or characteristics and/or amount of network traffic, thermal noise, electric noise, and so forth.

Example features of the present invention include adaptively guiding seed generation based on 1) use of better entropy sources, 2) better use available entropy sources, 3) speeding the generation of each seed, 4) the predetermined security strength, 5) minimizing the occurrence of acquiring or reaching a predetermined maximum number of entropy bits, 6) rebooting and beginning again to avoid the appearance of freezing or crashing of an electronic device, 7) minimizing user waiting periods during boot-up into the cryptographic operation or other use, 8) maximizing the speed of booting up, 9) avoiding insecure, 9) generate a new seed for each operation or use (optionally even more frequently), and 10) hiding strings of bits by mapping transforming (e.g., from smaller to larger places), and 11) iteratively estimating or calculating a number of bits needed to reach a predetermined entropy strength based on one iteration or a history of iterations (e.g., average, mean, standard deviation, and so forth). Either way, however, the present method measures the entropy strength and estimates how may more data bits may be needed based on the results of the measured entropy strength. In this, it does not matter if the entropy strength of one electronic device's sleep operation is used to acquire more entropy data bits than another's disk read write operation, the entropy evaluation module estimates remaining entropy data bits needed based on a acquisition by acquisition basis and adaptively guides the electronic device according to the result.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. An electronic device configured for determining a seed for use in a cryptographic operation, the electronic device comprising:
    a pseudo random number generator configured to estimate a number of entropy data bits needed to satisfy a predetermined security strength of the cryptographic operation based on an entropy strength of a string of data bits, the entropy strength being a measure of randomness;
    wherein the pseudo random number generator is configured to guide a determination of the seed differently according to the estimated number of entropy data bits;
    a cryptographic operation module configured to perform the cryptographic operation using a pseudo random sequence having an entropy strength from a key and entropy data;
    an entropy evaluation module configured to determine the entropy strength of the string of data bits and decide whether the determined entropy strength satisfies the predetermined security strength;
    a seed determining module configured to determine the seed at least in part from the string of data bits upon deciding that the determined entropy strength satisfies the predetermined security strength; and
    an entropy data acquisition module configured to acquire additional entropy data bits upon deciding that the determined entropy strength of the string of bits fails to satisfy the predetermined security strength;
    wherein the electronic device is configured to use at least one of the additional entropy data bits in determining the seed for use in the cryptographic operation.

2. The electronic device according to claim 1, wherein the electronic device further comprises:
the seed determining module further configured to transform an N-bit string of entropy data bits to an M-bit string of entropy data bits using secret key encryption, wherein N and M are integers and N is less than M;
wherein the electronic device is configured to use at least part of the M-bit string of entropy data bits in the cryptographic operation.

3. The electronic device according to claim 1, wherein the electronic device further comprises:
a module configured for rebooting the electronic device upon an acquisition of a predetermined maximum number of entropy data bits;
wherein after rebooting the electronic device, the electronic device is configured to estimate a second number of entropy data bits to satisfy the predetermined security strength of the cryptographic operation; and
wherein the electronic device is configured to perform the cryptographic operation after rebooting upon determining that a different string of bits satisfies the predetermined security strength, the different string of data bits being based at least in part in acquiring the second number of entropy data bits.

4. The electronic device according to claim 1, further comprising:
a module configured to use the key and an additional entropy data to determine the pseudo random sequence, wherein the key is a secret key and the additional entropy data is acquired from at least one entropy source at least using a counter, a timer, or file information; and
wherein the electronic device is configured to use the secret key and the additional entropy data acquired from the at least one entropy source to generate the seed for use in the cryptographic operation.

5. A method of determining a seed for use in a cryptographic operation for an electronic device, the method comprising:
estimating, at a pseudo random number generator included in the electronic device, a number of entropy data bits needed to satisfy a predetermined security strength of the cryptographic operation based on an entropy strength of a string of data bits, wherein the entropy strength is a measure of randomness;
guiding, at the pseudo random number generator, determining of the seed differently according to the estimated number of entropy data bits;
determining, at an entropy evaluation module, the entropy strength of the string of data bits;
deciding, at the entropy evaluation module, whether the determined entropy strength satisfies the predetermined security strength;
determining, at a seed determining module, the seed at least in part from the string of data bits upon deciding that the determined entropy strength satisfies the predetermined security strength; and
acquiring, at an entropy data acquisition module, additional entropy data bits upon deciding that the determined entropy strength fails to satisfy the predetermined security strength;
wherein at least one of the additional entropy data bits is used to generate the seed for use in the cryptographic operation.

6. The method according to claim 5, further comprising:
performing, at a cryptographic operation module, the cryptographic operation using a pseudo random sequence having an entropy strength from a key and entropy data.

7. The method according to claim 5, further comprising:
concatenating, at the entropy data acquisition module, multiple strings of data bits; and
wherein the concatenated multiple strings of data bits are used at least in part in determining the seed for use in the cryptographic operation.

8. The method according to claim 7, further comprising:
hashing, at the entropy data acquisition module, at least part of the concatenated multiple string of bits, wherein hashing is used at least in part in determining the seed for use in the cryptographic operation;
generating, at the seed determining module, the seed at least in part using at least part of the hashed concatenated multiple strings of bits; and
performing, at a cryptographic operation module, the cryptographic operation using at least part the hashed concatenated multiple strings of bits.

9. The method according to claim 5, further comprising:
rebooting the electronic device upon determining that a maximum number of entropy data bits has been acquired;
estimating, at the pseudo random generator, a second number of entropy data bits after rebooting to satisfy the predetermined security strength of the cryptographic operation; and
performing, at a cryptographic operation module, the cryptographic operation after rebooting upon determining that a different string of bits satisfies the predetermined security strength, the different string of bits being based at least in part on acquiring the second number of entropy data bits.

10. The method according to claim 5, further comprising:
transforming, at the seed determining module, an N-bit string of entropy data bits to an M-bit string of entropy data bits using secret key encryption, wherein N and M are integers and N is less than M; and
performing, at a cryptographic operation module, the cryptographic operation using at least part of the M-bit string of entropy data bits after transforming.

11. The method according to claim 5, further comprising:
acquiring, at the entropy data acquisition module, the additional entropy data bits from one or more entropy sources, wherein the additional entropy data bits are acquired using at least one of file information, a drive seek time, a digitization process, an assessment process, an optional conditioning process, a counter value determined during at least one interrupt, or a counter value determined during a sleep mode.

12. The method according to claim 7, further comprising:
acquiring, at the entropy data acquisition module, at least two of the concatenated multiple string of bits from different entropy sources;
generating, at the seed determining module, the seed at least in part using the concatenated multiple string of bits; and
performing, at a cryptographic operation module, the cryptographic operation at least in part using the generated seed.

13. The method according to claim 5, further comprising:
sending, by the entropy evaluation module, an error upon determining that a maximum number of entropy data bits has been acquired;
acquiring, by the entropy evaluation module, a second number of entropy data bits after sending the error;
generating, at the seed determining module, the seed at least in part from the second number of entropy data bits; and performing, at a cryptographic operation module, the cryptographic operation using the generated seed.

14. The method according to claim 5, further comprising:
acquiring, at the entropy data acquisition module, the additional entropy data bits upon deciding that the entropy strength fails to satisfy the predetermined security strength;
processing, at the entropy data acquisition module, the additional entropy data bits, wherein processing includes one or more of hashing, concatenating, or mapping multiple independent strings of bits; and
performing, at a cryptographic operation module, the cryptographic operation using a pseudo random sequence having an entropy strength from a secret key and entropy data.

15. A non-transitory computer readable storage medium on which is embedded one or more computer programs, said one or more computer programs implementing a method for determining a seed for use in a cryptographic operation, said one or more computer programs comprising computer readable code for:
estimating a number of entropy data bits needed to satisfy a predetermined security strength of the cryptographic operation based on an entropy strength of a string of data bits, wherein the entropy strength is a measure of randomness;
guiding determining of the seed differently according to the estimated number of entropy data bits;
determining the entropy strength of the string of data bits;
deciding whether the determined entropy strength satisfies the predetermined security strength;
determining the seed at least in part from the string of entropy data bits upon deciding that the determined entropy strength satisfies the predetermined security strength; and
acquiring additional entropy data bits upon deciding that the determined entropy strength fails to satisfy the predetermined security strength;
wherein at least one of the additional entropy data bits is used to generate the seed for use in the cryptographic operation.

16. The non-transitory computer readable storage medium according to claim 15, further comprising code for:
acquiring additional entropy data bits upon deciding that the entropy strength fails to satisfy the predetermined security strength;
processing the additional entropy data bits, wherein processing includes one or more of hashing, concatenating, or mapping multiple independent strings of bits; and
performing the cryptographic operation using a pseudo random sequence having an entropy strength from a secret key and entropy data.

* * * * *